Dec. 2, 1924.
J. H. BALLANTINE
THERMOSTATIC GAS CONTROL DEVICE FOR WATER HEATERS
Filed Aug. 13, 1923
1,517,389
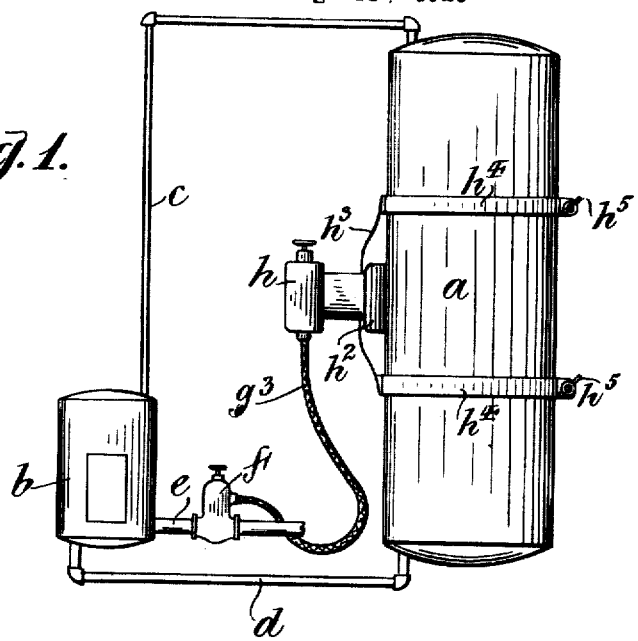
Fig. 1.
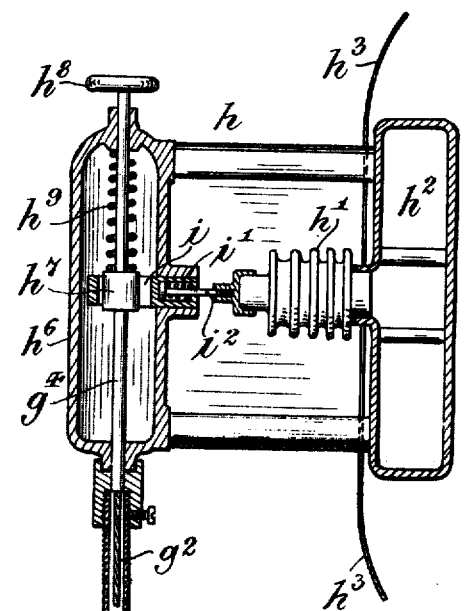
Fig. 2.
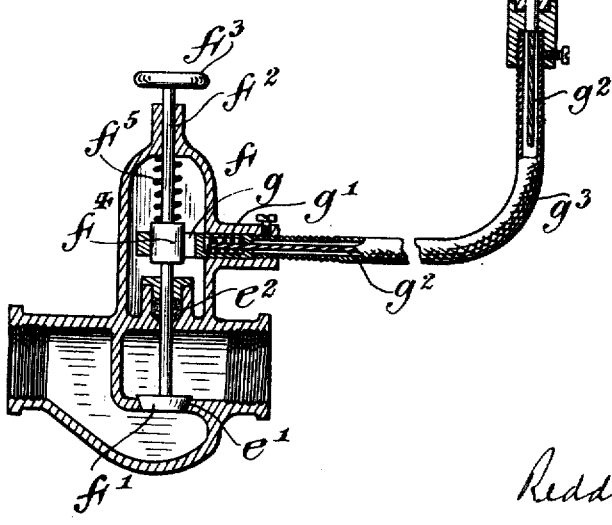
INVENTOR
John H. Ballantine
BY
Redding, Greeley, O'Shea & Campbell
ATTORNEYS Patented Dec. 2, 1924.

1,517,389

UNITED STATES PATENT OFFICE.

JOHN H. BALLANTINE, OF CEDARHURST, NEW YORK, ASSIGNOR TO NEPTUNE METER COMPANY, OF NEW YORK, N. Y., A CORPORATION OF PENNSYLVANIA.

THERMOSTATIC GAS-CONTROL DEVICE FOR WATER HEATERS.

Application filed August 13, 1923. Serial No. 657,127.

*To all whom it may concern:*

Be it known that I, JOHN H. BALLANTINE, a citizen of the United States, and a resident of Cedarhurst, in the county of Nassau and State of New York, have invented certain new and useful Improvements in Thermostatic Gas-Control Devices for Water Heaters, of which the following is a specification, reference being had to the accompanying drawings, forming a part hereof.

Tanks for the supply of hot water for domestic purposes are now commonly supplied with an attachment by which the heating of the water is effected by combustion of fuel gas. The supply of the fuel gas, for a tube heater, is sometimes controlled by variations of pressure within the water tank, the gas being turned on fully whenever pressure is relieved by the drawing of water at any point and being cut off when the drawing of water is stopped. In the ordinary installation, however, no provision is made for controlling the supply of fuel gas except by hand, with the result that through carelessness the gas is permitted to burn after the requisite quantity of water has been heated to the desired temperature. The object of this invention is to provide a device by which the supply of fuel gas will be cut off automatically when the required quantity of water at the desired temperature has accumulated in the tank, the construction of the device being such that it can be installed without difficulty regardless of the precise relative location of the heater and tank and shall be certain and safe in operation under all conditions.

In accordance with the invention the gas cut-off valve is released, to stop the supply of fuel gas, by the operation of a thermostatic device, of any suitable character, which is in close proximity to the water tank and can be moved to any desired position in a vertical direction. The invention will be more fully explained hereinafter with reference to the accompanying drawings in which it is illustrated and in which—

Figure 1 is a view in elevation showing a hot water tank and heater with the gas control device in operative relation therewith.

Figure 2 is a detail view, mainly in section, and on a larger scale, showing the gas valve and thermostatic control indicated in Figure 1.

The invention is illustrated, in Figure 1, in connection with an ordinary domestic hot water tank $a$, a gas heater $b$, connected with the tank $a$ by delivery and return pipes $c$ and $d$ as usual, and a fuel gas supply pipe $e$. The gas cut-off valve, indicated at $f$ in Figure 1, and shown in detail, in an approved form, in Figure 2, may be of any construction suited to the application of the invention. In the form illustrated in the drawings it comprises a valve head $f'$, arranged to co-operate with a valve seat $e'$ in the gas supply pipe $e$, a valve stem $f^2$ provided with a hand piece $f^3$ and a collar $f^4$. A spring $f^5$ may be provided to insure the proper seating of the valve when released, and a packing gland may be provided at $e^2$. The valve is shown in Figure 1, in its closed position, but is held in its open position by the co-operation of a detent $g$ with the collar $f^4$ of the valve stem, such detent being held normally in engagement with the collar $f^4$ as by a spring $g'$. The detent $g$ is arranged to be tripped by the operation of a thermostatic device as will now be described.

The thermostatic device also may be of any suitable character. That chosen for illustration, as shown at $h$ in Figure 1, is of the ordinary accordion type, having an expanding member $h'$ with a relatively large expansion chamber $h^2$ so that the necessary expansion of the expanding member $h'$ will be produced with certainty within a comparatively slight range of temperature variation. This thermostatic device is supported with the expansion chamber $h^2$ in close proximity to the tank $a$ and is preferably supported so that its position can be adjusted vertically in order that the supply of fuel gas to the heater shall be cut off when the desired quantity of heated water has accumulated in the tank $a$. As is well understood, the water heated in the heater $b$ enters the tank $a$ at the top while the water to be heated passes from the bottom of the tank into the heater. Ordinarily the circulation of the water through the tank is not rapid, so that the heated water gradually accumulates in the upper part of the tank, while the water in the lower part of the tank may remain at a comparatively low temperature. As the accumulation of heated water continues, the line of temperature at which the thermostatic device will operate descends in the tank and the thermostatic device may therefore be set at that point at which it will operate when the desired volume of heated water has accumulated in the tank. In order that the position of the thermostatic device may thus be adjusted it may be supported by a bridge piece $h^3$ connected at its ends to two band clamps $h^4$ which encircle the tank $a$, such band clamps being provided with suitable clamping screws as at $h^5$. When the band clamps $h^4$ are slightly loosened the thermostatic device can be moved toward the upper end or toward the lower end of the tank as may be desired.

In the embodiment of the invention shown in Figure 2, the detent $g$ is operated, against the action of the spring $g'$, by a flexible rod $g^2$ within a flexible tube $g^3$. The rod $g^2$ has an extension or stem $g^4$, mounted in a housing $h^6$, which may form part of the thermostat housing, and provided with a collar $h^7$, a hand piece $h^8$, and an actuating spring $h^9$. A detent $i$, in this embodiment of the invention, is arranged to engage the collar $h^7$ under the influence of a spring $i'$, and is directly connected, as by a rod $i^2$, with the expanding member $h'$ of the thermostatic device. The connection of the thermostatic device with the cut-off valve through the detent $i$, the flexible connection $g^2$, and the detent $g$, renders the release of the cut-off valve independent of the distance between the thermostatic device and the cut-off valve so that the device can be installed readily and requires no testing or adjustment on the job, the testing and adjustment being effected in the shop. Furthermore, the provision of the two detents, the one for the valve stem and the other for the releasing rod, insures the proper attention of the attendant, and the valve stem $f^2$ will not be held in its open position, to permit the supply of gas to the heater, until the actuating rod $g^2$ has been drawn up and engaged by the detent $i$, the operative condition of which is determined by the thermostatic device. Similarly, the detent $g$ cannot be drawn into operative position by the handle $h^8$ and held until the valve $f'$ has been raised and the collar $f^4$ also raised to position to permit a full movement of the detent $g$ into locking position.

It will be understood that various changes in details of construction and arrangement, as with respect, for example, to the character of the thermostatic device and the form of cut-off valve, without departing from the spirit of the invention which, as pointed out in the claims, is not limited to any particular construction and relation shown and described herein.

I claim as my invention:

1. A thermostatic control device for water heaters, comprising a valve to control the supply of fuel gas, means acting normally to close the valve, a thermostatic device subject to the variations of temperature in the tank, a detent to hold the valve open, spring actuated means to actuate the detent to release the valve, a second detent for co-operation with said means to prevent the operation thereof, and an operating connection between the thermostatic device and the second detent.

2. A thermostatic control device for water heaters, comprising a valve to control the supply of fuel gas, means acting normally to close the valve, a thermostatic device subject to the variations of temperature in the tank, a detent to hold the valve open, spring actuated means to actuate the detent to release the valve, a second detent for co-operation with said means to prevent the operation thereof, and an operating device to restore the valve to open position and to restore said means to operating position.

This specification signed this 9th day of August, A. D. 1923.

JOHN H. BALLANTINE.

Certificate of Correction.

It is hereby certified that the State of incorporation of the assignee in Letters Patent No. 1,517,389, granted December 2, 1924, upon the application of John H. Ballantine, of Cedarhurst, New York, for an improvement in "Thermostatic Gas-Control Devices for Water Heaters," was erroneously given as "Pennsylvania" whereas said State should have been given as *New Jersey*, as shown by the records of assignments in this office; and that the said Letters Patent should be read with this correction therein that the same may conform to the record of the case in the Patent Office.

Signed and sealed this 6th day of January, A. D. 1925.

[SEAL.]

KARL FENNING,
*Acting Commissioner of Patents.*